United States Patent
de Oliveira et al.

(10) Patent No.: US 12,463,872 B2
(45) Date of Patent: Nov. 4, 2025

(54) DISTRIBUTED AND DLT-BASED SFC PARTITIONING OVER MULTIPLE PROVIDERS IN EDGE ENVIRONMENTS

(71) Applicant: Dell Products L.P., Round Rock, TX (US)

(72) Inventors: Ana Cristina Bernardo de Oliveira, Rio de Janeiro (BR); Antonio Augusto De Aragão Rocha, Niterói (BR); Evandro Luiz Cardoso Macedo, Jardim Carioca (BR); Flavia Coimbra Delicato, Niterói (BR); Paulo de Figueiredo Pires, Niterói (BR); Rayan Gustavo Oliveira Jucá Lima, Rio de Janeiro (BR); Thais Vasconcelos Batista, Natal (BR); Thiago Pereira da Silva, Barra do Garças (BR)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 18/627,620

(22) Filed: Apr. 5, 2024

(65) Prior Publication Data
US 2025/0317358 A1     Oct. 9, 2025

(51) Int. Cl.
*G06F 15/173*     (2006.01)
*H04L 41/0895*     (2022.01)
*H04L 41/5019*     (2022.01)
*H04L 45/12*     (2022.01)

(52) U.S. Cl.
CPC ...... *H04L 41/0895* (2022.05); *H04L 41/5019* (2013.01); *H04L 45/124* (2013.01)

(58) Field of Classification Search
CPC ............ H04L 41/0895; H04L 41/5019; H04L 45/124
See application file for complete search history.

(56) References Cited

U.S. PATENT DOCUMENTS

| | | | |
|---|---|---|---|
| 10,944,647 B2 * | 3/2021 | Tidemann | H04L 41/5009 |
| 2016/0261495 A1 * | 9/2016 | Xia | H04L 45/44 |
| 2017/0318097 A1 * | 11/2017 | Drew | H04L 41/0897 |

(Continued)

OTHER PUBLICATIONS

Yang, et al. "Recent advances of resource allocation in network function virtualization." IEEE Transactions on Parallel and Distributed Systems 32.2 (2020) pp. 295-314.

(Continued)

*Primary Examiner* — Duyen M Doan
(74) *Attorney, Agent, or Firm* — Workman Nydegger (57) ABSTRACT

A service partitions a service function chain (SFC) into multiple virtualized network functions (VNFs). The services deploys the VNFs to a smart contract operating in a distributed ledger. The smart contract initiates a bid to service the SFC. Multiple infrastructure providers (InPs) are identified and included in a graph structure. The graph is organized to reflect the order by which the VNFs are to be serviced by the different InPs. The graph also lists the costs the InPs require to service the various different VNFs. The InPs included in a specific graph traversal having the smallest cost are selected, but the cost that is used is the cost for the graph traversal having the penultimate smallest cost. The service outputs the selected InPs as well as the penultimate smallest cost.

20 Claims, 7 Drawing Sheets

(56) References Cited

U.S. PATENT DOCUMENTS

| | | | |
|---|---|---|---|
| 2018/0034714 A1* | 2/2018 | Zhang | H04L 41/0895 |
| 2023/0130420 A1* | 4/2023 | de Mattos | H04L 41/0823 703/21 |

OTHER PUBLICATIONS

Zhao, et al. "Towards resource-efficient service function chain deployment in cloud-fog computing," IEEE Access, vol. 6, No. c, p. 66754-66766, 2018.

Abu-Lebdeh, et al. "NFV orchestrator placement for geo-distributed systems," 2017 IEEE 16th Int. Symp. Netw. Comput. Appl. NCA 2017, vol. 2017-Janua, No. November, pp. 1-5, 2017.

Kibalya, et al. "A Multi-Stage Graph Aided Algorithm for Distributed Service Function Chain Provisioning Across Multiple Domains," in IEEE Access, vol. 9, pp. 114884-114904, 2021.

Liu, et al. "GDM: A General Distributed Method for Cross-Domain Service Function Chain Embedding," in IEEE Transactions on Network and Service Management, vol. 17, No. 3, pp. 1446-1459, Sep. 2020.

Sun, et al. "Service Function Chain Orchestration Across Multiple Domains: A Full Mesh Aggregation Approach," in IEEE Transactions on Network and Service Management, vol. 15, No. 3, pp. 1175-1191, Sep. 2018.

Toumi, et al. "Towards Cross-Domain Service Function Chain Orchestration," EUROCOM 2020, pp. 1-5.

Li, et al. "A Cross-Domain Service Function Chain Deployment Scheme Based on Bargaining Game", Mathematical Problems in Engineering, vol. 2021, Article ID 6669917, 12 pages, 2021.

Barroso, et al. "The Datacenter as a Computer: an introduction to the design of warehouse-scale machines" 2nd Edition, Morgan & Claypool Publishers, 2013.

Santos, et al. "Service Function Chain Placement in Distributed Scenarios: A Systematic Review", Journal of Netwwork and Systems Management 30, 4 (2022).

Zhang, et al. "The intelligent multi-domain service function chain deployment: architecture, challenges and solutions", Int. J. Commun. Syst. 34, 1 (2021), pp. 1-20.

Zhao, et al. "A cooperative scheduling scheme of local cloud and internet cloud for delay-aware mobile cloud computing" arXiv:1511.08540v1 (2015).

Chen, et al. "Mosc: a method to assign the outsourcing of service function chain across multiple clouds" Comput. Netw. 133, 166-182 (2018).

* cited by examiner

Figure 1

| Notation | Description |
|---|---|
| $I = \{0,1,2,...,p\}$ | Set of Infrastructure Providers (InPs). |
| $SFC_k = \{vnf_{k,1}, vnf_{k,2}, ..., vnf_{k,n}\}$ | Arrangement of VNFs that defines an SFC required by a user k |
| $VNF_i$ | Set of VNFs offered by an InP i |
| $VNF_k^i = VNF_i \cap SFC_k$ | Set of VNFs of InP i that intersects with $SFC_k$ |
| $W = \{w_0, w_n\}$ | Set with graph nodes that represent the respective source and destination of the $SFC_k$ |
| $V = \bigcup_{i \in I} VNF_k^i \cup W$ | Set of all nodes in the graph. |
| $E$ | Set of links between graph nodes with the weights of the edges being the related computation and network costs |
| $G = (V, E)$ | Directed graph of the possibilities of allocation of VNFs in different providers. |

*Figure 2*

| InP | VNFs |
|---|---|
| 1 | $[vnf^1_{k,1}, vnf^1_{k,2}]$ |
| 2 | $[vnf^2_{k,1}, vnf^2_{k,3}]$ |
| 3 | $[vnf^3_{k,1}]$ |
| 4 | - |
| 5 | - |
| 6 | $[vnf^6_{k,3}]$ |
| 7 | $[vnf^7_{k,2}]$ |
| 8 | $[vnf^8_{k,2}]$ |
| 9 | - |
| 10 | $[vnf^{10}_{k,2}]$ |

|  | $w_0$ | $vmf^1_{k,1}$ | $vmf^2_{k,1}$ | $vmf^3_{k,1}$ | $vmf^1_{k,2}$ | $vmf^7_{k,2}$ |
|---|---|---|---|---|---|---|
| $w_0$ | 8 | 8 | 8 | 8 | 8 | 8 |
| $vmf^1_{k,1}$ | 8 | 0 | 0 | 0 | 8 | 8 |
| $vmf^2_{k,1}$ | 8 | 8 | 8 | 8 | 2 | 10 |
| $vmf^3_{k,1}$ | 8 | 8 | 8 | 8 | 5 | 4 |
| $vmf^1_{k,2}$ | 8 | 8 | 8 | 8 | 7 | 8 |
| $vmf^7_{k,2}$ | 8 | 8 | 8 | 8 | 8 | 8 |

DISTRIBUTED AND DLT-BASED SFC PARTITIONING OVER MULTIPLE PROVIDERS IN EDGE ENVIRONMENTS

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to servicing a workload. More particularly, at least some embodiments relate to systems, hardware, software, computer-readable media, and methods for partitioning a workload into multiple discrete sub-workloads and for allocating those sub-workloads to multiple different service providers.

BACKGROUND

The spread of the Network Function Virtualization (NFV) paradigm leveraged the ability of providers to virtualize their physical resources, dynamically instantiating them according to customers' needs. The implementation of network services takes the form of Virtualized Network Functions (VNFs), which can be chained together, defining a sequence known as Service Function Chain (SFC), that represents an end-to-end service delivered to customers. Through SFCs, providers can create and manage flows of network functions between multiple edge devices. Nevertheless, in a constantly changing environment, ensuring the proper execution of SFCs is a challenge in terms of providing the services defined by the SFC satisfying the established quality of service (QoS), while optimizing the utilization of providers' resources.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION

The spread of the NFV paradigm leveraged the ability of providers to virtualize their physical resources, dynamically instantiating them according to customers' needs. The implementation of network services takes the form of VNFs, which can be chained together, defining a sequence known as an SFC that represents an end-to-end service delivered to customers. Through SFCs, providers can create and manage flows of network functions between multiple edge devices. In a constantly changing environment, ensuring the proper execution of SFCs is a challenge, particularly in terms of providing the services defined by the SFC while also satisfying the established QoS and optimizing the utilization of providers' resources.

In some scenarios, the requirements of an SFC cannot be fully met by a single service provider. In these cases, it would be advantageous to explore collaboration between providers to cover a greater number of services. This way, rather than meeting all or none of an SFC's requirements, a provider may only partially fulfill a service request. Such an approach would allow, on the one hand, more service requests to be fulfilled, and on the other hand, more providers to provide their services.

To enable the above type of approach, there is a need for strategies to provide SFCs in a distributed and partitioned way by splitting their VNFs into groups that are each assigned to a corresponding provider. This way, providers will not necessarily run an entire SFC, but rather will run a partition of the SFC.

The disclosed embodiments provide various benefits, advantages, and practical applications to workflow management. Beneficially, the embodiments address the SFC partitioning problem in a virtualized edge computing environment. The embodiments provide novel aspects of a graph-based and distributed ledger technology (DLT) augmented approach to provide an efficient solution. Given that such partitioning is performed in environments with the presence of autonomous providers that might have conflicting interests, the embodiments are uniquely able to consider a layer-2 smart contract to provide trust during a disclosed auction-based approach for the decision process.

The synergy of NFV and edge computing enables the creation of a logical network that is dedicated and customized to meet specific requirements of applications on top of physical infrastructures. In the NFV context, a VNF decouples network functions from the specific underlining hardware where VNFs can be executed on different virtual nodes deployed on edge devices. Such VNFs can be chained, composing an SFC that denotes an end-to-end service to be provided to the user/consumer. An SFC can be created by defining a sequence of VNFs to process the data streams produced by an application.

There are several challenges regarding resource management in distributed environments, such as in edge computing, where allocation ranges from decision making regarding the placement of VNFs on edge nodes, to provisioning of computing and network resources to run VNFs (including the VNF scaling), and even to migration operations. Recent solutions for resource allocation and orchestration problems in NFV scenarios consider a variety of approaches such as combinatorial optimization theory, graph theory, deep reinforcement learning, game theory, and heuristic-based solutions. Resource allocation is even more challenging in edge computing since such allocation is performed by considering multiple infrastructure providers (InPs), with each provider being responsible for executing a sub-part (or partition) of an SFC. Advantageously, the disclosed embodiments are able to address those challenges.

For instance, one objective of the disclosed embodiments is to address some of these challenges in terms of assigning parts of SFCs over different InPs by proposing a distributed solution to tackle the related problems in edge computing environments. Different techniques and models can be adopted to deal with such challenges. Some of the disclosed embodiments adopt a graph-based DLT-augmented approach to tackle the resource allocation problem. The DLT also provides a heightened level of confidence and trust in the operations. Use of the DLT also allows the embodiments to operate without requiring the use of a central source of authority.

This approach advantageously seeks to decide which provider is to be responsible for meeting which partition of a user's SFC request. The disclosed approach also finds an efficient allocation for the entire SFC while still respecting various service level agreement (SLA) restrictions. The graph includes the possible VNF allocations among different providers. Once the graph is formed, the embodiments can beneficially run a reverse auction (e.g., perhaps a reverse Vickey's auction) by selecting one of the shortest, or at least cheapest, paths between source and destination defined in the SFC and by deciding which providers will participate in meeting each SFC partition.

The embodiments aim to leverage the intrinsic advantages of the disclosed auction approach to improve resource scheduling efficiency in a competitive environment. Compared with a simple allocation approach using fixed prices, an auction mechanism provides more economic efficiency for suppliers according to customer demands, more flexible allocation of resources (SFCs), and finer targeting of customers.

Given that such an approach considers different InPs with possibly contradictory business objectives, it is beneficial to provide a solution that guarantees the parties' trustworthiness. Due to distinguished commercial interest, providers do not want to reveal the details of their infrastructure for other providers, so the lack of complete topology visibility, control, and interoperability is taken into account by the disclosed embodiments. Thus, solutions are provided to enable some trust between the entities involved and to guarantee the veracity of related information.

Beneficially, such solutions also maintain security and tamper-proof storage of information on resource usage, which is used for billing and measuring providers' performances. The embodiments also consider a DLT-augmented approach to provide trust among providers. To do so, the embodiments use a layer-2 blockchain that enables a distributed solution through the execution of a smart contract that manages the creation of the previously mentioned graph of possible VNF allocations among different providers. A layer-2 blockchain is a technology that enhances the scalability and efficiency of layer-1 blockchains (e.g., Ethereum) by performing tasks without the need of the consensus mechanisms of layer-1 blockchains. Accordingly, these and numerous other benefits will now be described in more detail throughout the remaining sections of this disclosure.

Example Architecture(s)

Figure 1:
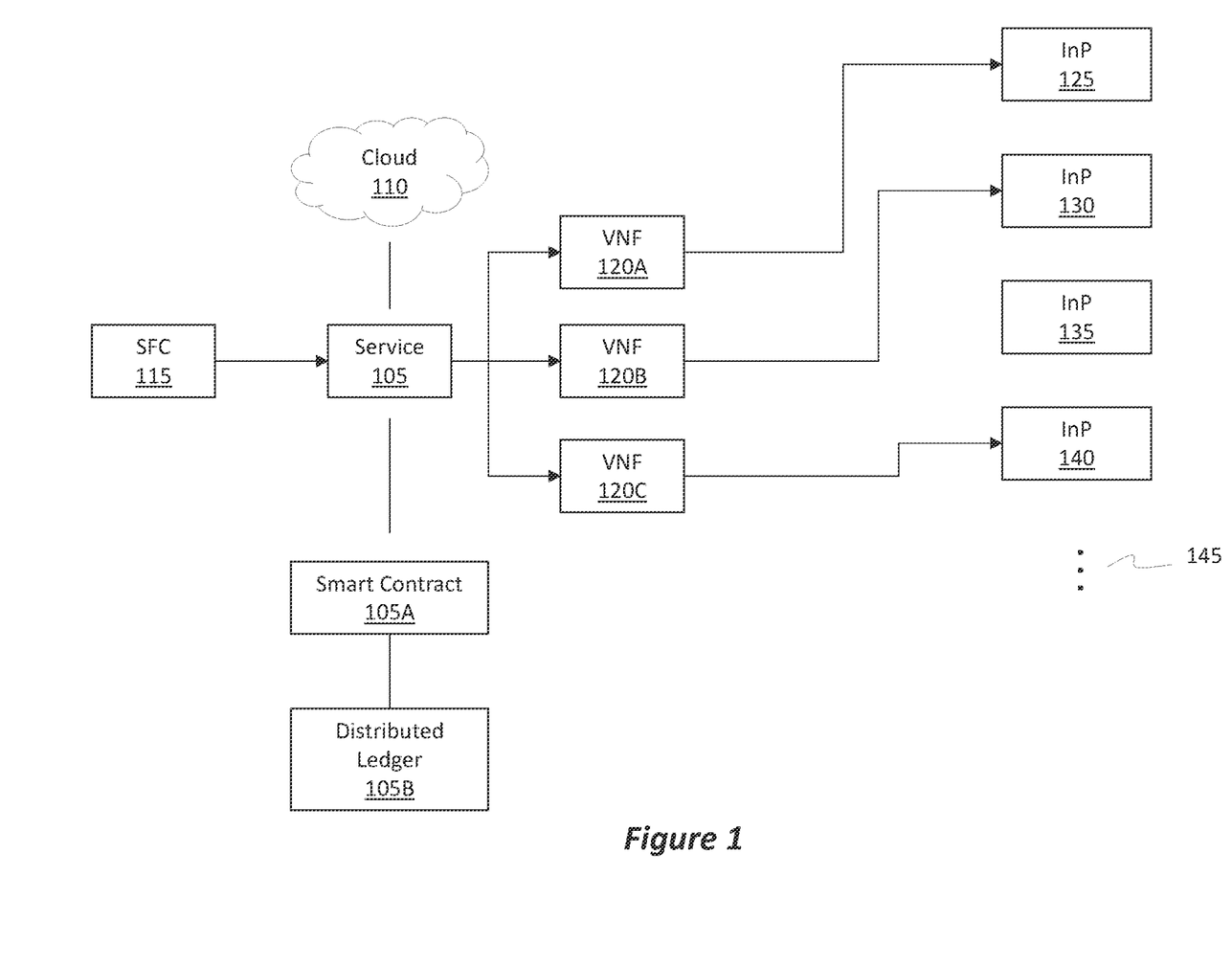
FIG. 1 illustrates an example computing architecture that is able to partition a workload and allocate the partitioned sections to multiple different service providers.

Having just described some of the high-level benefits, advantages, and practical applications provided by the disclosed embodiments, attention will now be directed to FIG. 1, which illustrates an example architecture 100 in which the disclosed principles may be employed. Architecture 100 shows a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Typically, service 105 is a local service operating on a local device, such as an edge device. In some implementations, service 105 is a cloud service operating in a cloud 110 environment. In some implementations, service 105 is a hybrid service that includes a cloud component operating in the cloud 110 and a local component operating on a local device. These two components can communicate with one another. Optionally, service 105 can include a smart contract 105A operating in a distributed ledger 105B. It might be the case that smart contract 105A and service 105 reside at different locations, but service 105 facilitates the control of smart contract 105A and thus it can be said that smart contract 105A is a component of (or at least operates under the direction of) service 105.

Service 105 is generally tasked with determining how to partition an SFC 115 into a group of VNFs, such as VNF 120A, VNF 120B, and VNF 120C. Service 105 is further tasked with determining how to distribute the VNFs 120A, 120B, and 120C among different InPs, such as InP 125, InP 130, InP 135, and InP 140. The ellipsis 145 indicates that any number of InPs may be present. In the example scenario of FIG. 1, service 105 assigned VNF 120A to InP 125; VNF 120B to InP 130; and VNF 120C to InP 140. The InPs can register with the service 105. With this registration, each InP can inform the service 105 of that InP's respective capabilities as well as the possibility of executing specific VNFs along with execution costs. This information may be recorded in the distributed ledger.

One problem with SFC placement in InPs consists of selecting the most suitable edge nodes to deploy and to execute the VNFs composing the SFC to thereby adequately meet application requests from multiple users. This process is performed in such a way that the QoS requirements of the applications are properly fulfilled (without violating a service level agreement) while trying to optimize the use of the various InPs' resources. Such selection is not trivial, given the diverse requirements to be considered, where those requirements are often conflicting and further given the heterogeneity, dynamism, and large scale of the environment.

One simplistic and historical approach to the SFC placement problem involves a winner-takes-all approach. In such an approach, the same administrative domain will accept the SFC request if it can provide the services to all its VNFs. In this case, there is no need to partition the SFC; rather, just a first, higher level decision regarding the domain that will serve it is adequate, and then internally a decision is made as to which nodes will receive which VNFs.

An even more challenging issue involves the consideration of a scenario where the SFC can have its VNFs split (or partitioned) into sub-sequences, with each sub-sequence placed at a different provider (i.e. InP). Such a problem relates to how SFCs can be better partitioned and distributed among providers in terms of service efficiency and costs for both users and providers.

The challenge of partitioning SFCs is part of the broader problem of orchestration and resource allocation in NFV environments. A resource allocation and orchestration process is to be timely, consistent, and safe, and is to lead to cost savings through automation and virtualization. Achieving such a goal is not trivial. To achieve the economies of scale expected from the use of NFV, it is desirable that the available physical resources are used efficiently. This is a challenging goal in the highly dynamic, heterogeneous, and large-scale environment of NFV, particularly in the context of edge computing.

As mentioned earlier, service 105 is tasked with addressing two major challenges, namely: (i) how to partition SFCs into groups of VNFs and (ii) how to distribute the SFC partitions among different InPs. Each of the problem statements is discussed in more detail in the following subsections.

Partitioning SFCs into Groups of VNFs and Distributing the VNFs

SFC placement can be a complex and challenging task. For example, in traditional cloud-based scenarios, considering a large data center hosting hundreds of racks with thousands of servers and dozens of network components, allocating the VNFs and maximizing resource usage in such a complex scenario is quite challenging. Specifically, as such VNFs are part of an SFC requested by users, their allocation should likely obey a predetermined grouping sequence in order to fulfill SFC request. How to efficiently partition an SFC into VNF groups is quite challenging given that each VNF has its own requirements. Additionally, there are stringent constraints in terms of delay that should be met so as not to violate the established SLAs.

Besides efficient partitioning of an SFC into VNF groups, it is also challenging how to effectively assign such groups to different providers while maintaining the sequence requirements of the original SFC. When selecting the nodes and links to service a complete SFC execution (considering all VNF groups), there are cases (e.g., such as multi-provider SFCs) where the related VNFs are deployed in different domains through non-linear paths. In fact, some of the users' SFC requests might not be fulfilled by a single provider if this provider is unable to meet one or more VNFs that compound the requested SFC. Nevertheless, if more providers cooperate by allocating the VNF groups that each provider is able to meet, then more user requests can be met. In a multi-provider scenario, communication over the Internet can make it difficult to meet delay constraints, and the SFC partitions placement solutions are to consider the high delay of inter-provider links.

In addition, the links that connect different providers may have different costs, and some specificities are to be considered in the SFC partitions placement solution in order to find the optimal placement strategy. Finally, it is beneficial to deal with issues of confidentiality and local autonomy, as different providers may not want to expose their internal information, which is often beneficial to make the best allocation decisions.

To address the above challenges, this disclosure proposes the following innovations. One innovation involves a unique, decentralized graph-based solution for SFC partitioning that finds the best allocation for the respective VNF groups of an SFC in different providers. The innovations further include an auction process using the shortest or cheapest path of the graph-based solution augmented with DLT to provide trust and decentralization.

Figure 2:
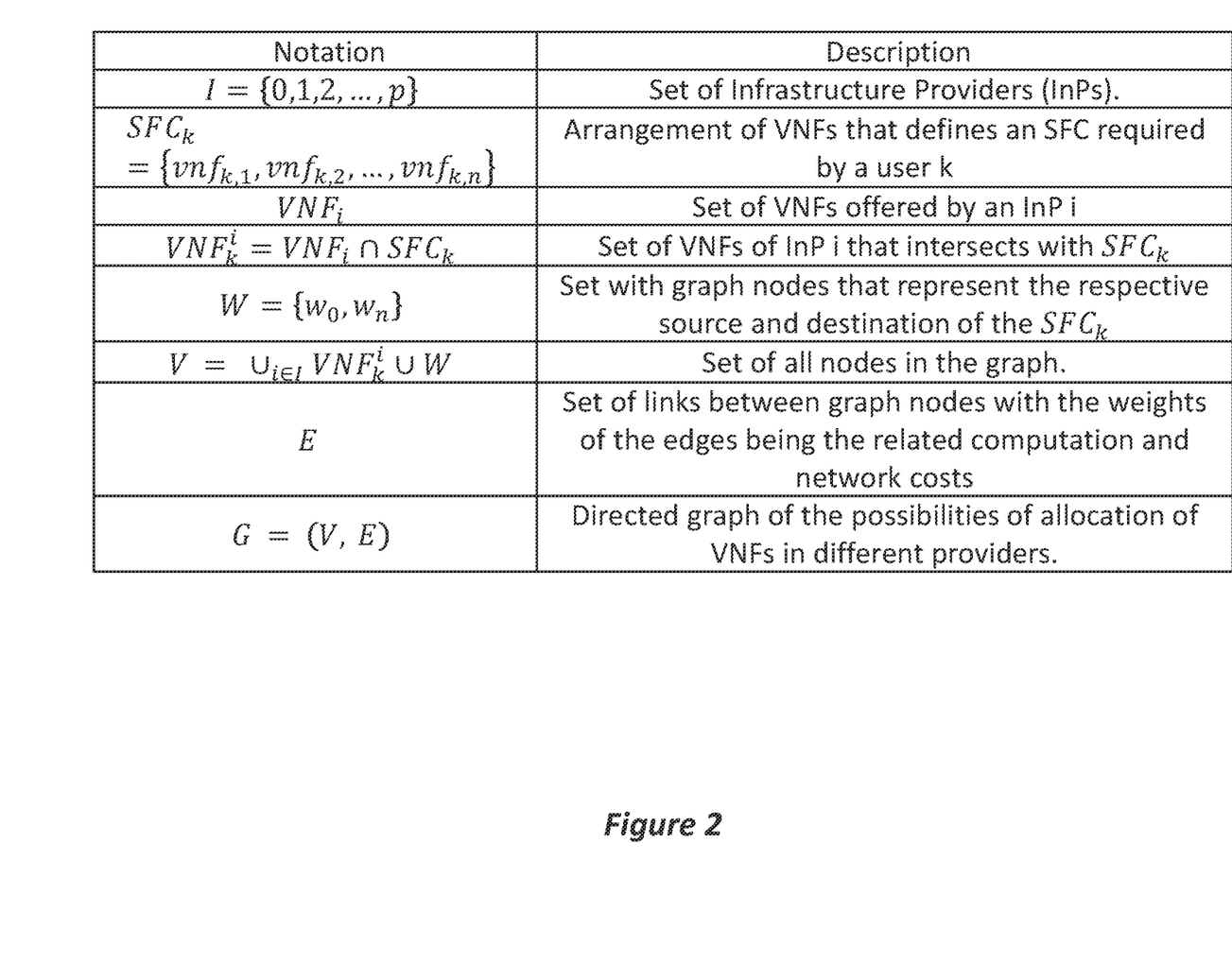
FIG. 2 illustrates a table listing various different notations and descriptions.

The SFC partitioning problem consists of finding the segmentation of the VNFs of an SFC that are best suited to be allocated to different providers in terms of costs and profits for end users and providers, respectively. The model that performs this segmentation considers elements of the capacity of the underlying infrastructure and the entities involved in the SFC partitioning and allocation processes. FIG. 2 shows an example table 200 providing an overview of certain notations and their respective descriptions.

The InPs are capable of allocating resources on their own physical infrastructure to provide services requested by end users and are represented by the set/in table 200. A service requested by the end user k is an SFC composed of VNFs organized in a sequence that is to be obeyed. Such an arrangement is represented by $SFC_k$ in table 200.

Each VNF of an SFC can be met by one or more InPs, and the specific VNFs that an InP can provide are represented by the set $VNF_i$. The set $VNF_k^i$ denotes the intersection between the VNFs that compose the requested $SFC_k$ and the VNFs that the InP i can provide. It is possible to form $VNF_k^i$ for all InPs that are cooperating or competing to meet the user request.

The set $W=\{w_0, w_n\}$ denotes the nodes of the graph G that represent the respective source and destination of the $SFC_k$. The union of the set W with the set $VNF_k^i$ for all i∈I defines the set V that defines all nodes of the graph G. The links between adjacent VNFs according to the predefined sequence in $SFC_k$ is denoted by E. The respective weight of an outgoing edge is defined by the related cost of running a VNF on that node and the network cost of using such a link. Finally, the embodiments provide a directed acyclic graph G(V, E) that gathers all the possibilities of allocation of VNFs on different providers in I.

As mentioned, the SFCs are partitioned or allocated among different providers. The strategies for the definition of the collaborative graph and the partitioning of the VNFs of an SFC are detailed herein.

Figure 3:
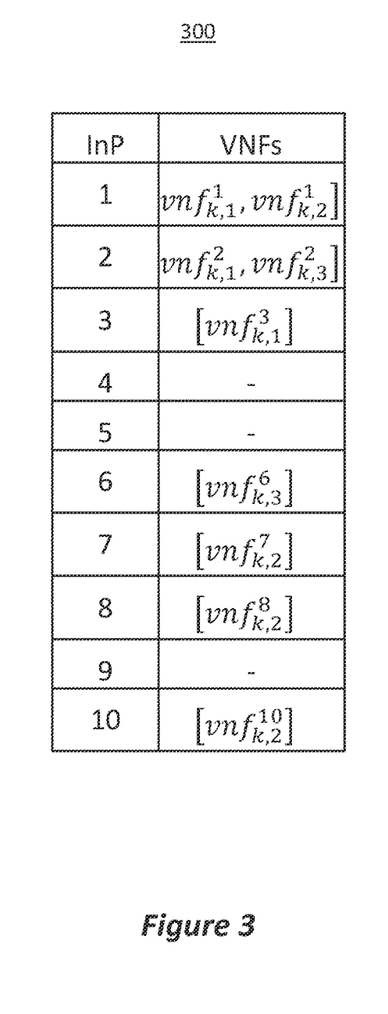
FIG. 3 illustrates an example table demonstrating how different service providers can service different workloads.

First, consider that a user k asks for the execution of an SFC composed of three different VNFs, defined as $SFC_k=\{vnf_{(k,1)}, vnf_{(k,2)}, vnf_{(k,3)}\}$. $SFC_k$ is defined in $W=\{w_0, w_3\}$. Consider also that 10 different InPs present VNF instances that are available and that match with the VNFs within $SFC_k$. The respective VNFs that each InP can provide are summarized in table 300 of FIG. 3. Notice that none of the InPs can provide all VNFs of the $SFC_k$, and some of them are unable to provide even one of the VNFs. Therefore, the user can have its SFC met only if the InPs are willing to partition the SFC among themselves.

Figure 4:
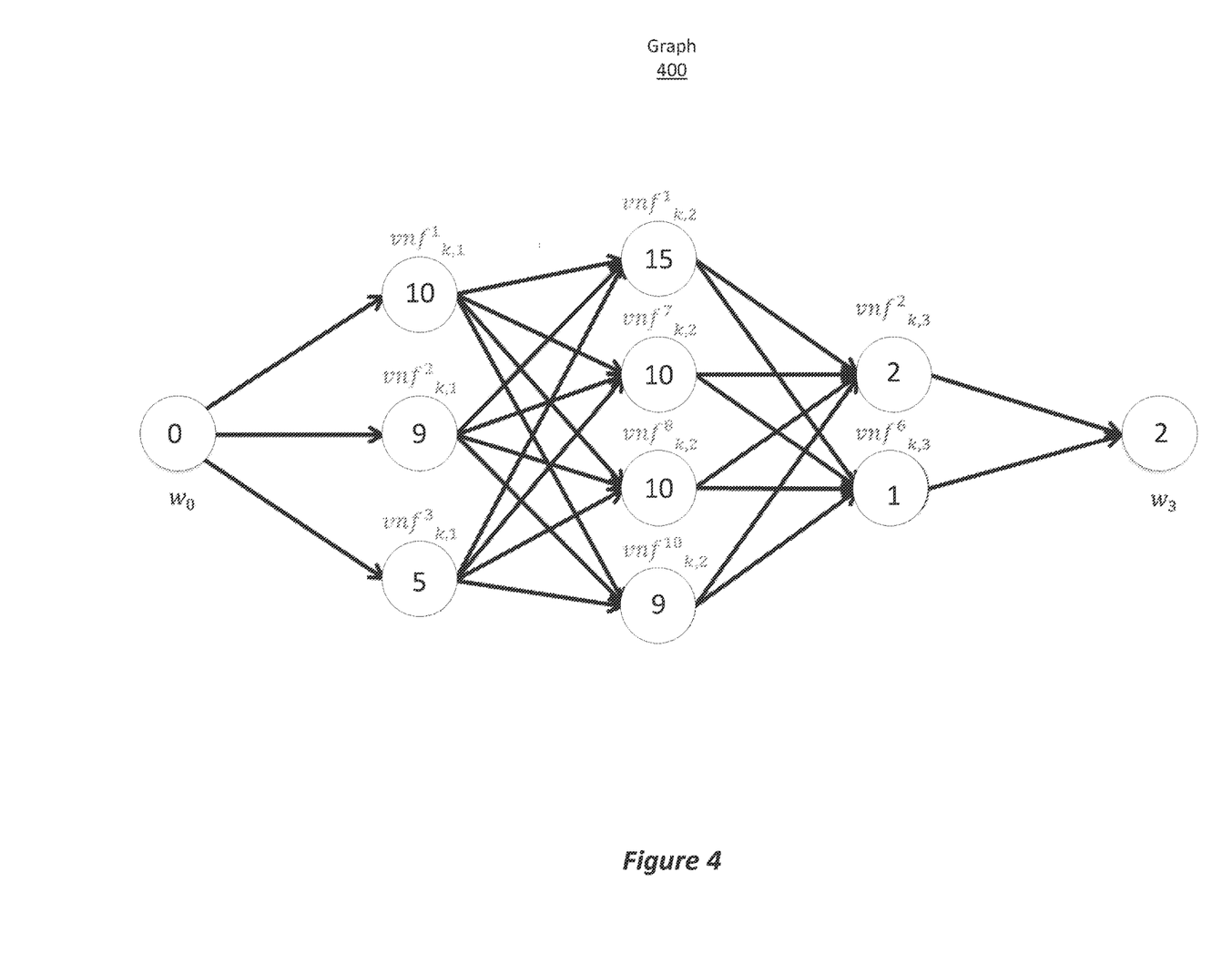
FIG. 4 illustrates an example graph listing different service providers that can service different workloads.

FIG. 4 depicts an example of graph 400 (e.g., graph G(V, E)), in which its nodes are defined by the following set:

$$V = \bigcup_{i \in I} VNF_k^i \cup W = \{w_0, vnf^1_{k,1}, vnf^2_{k,2}, vnf^2_{k,1}, \ldots, vnf^{10}_{k,2}, w_3\}$$

Figure 5:
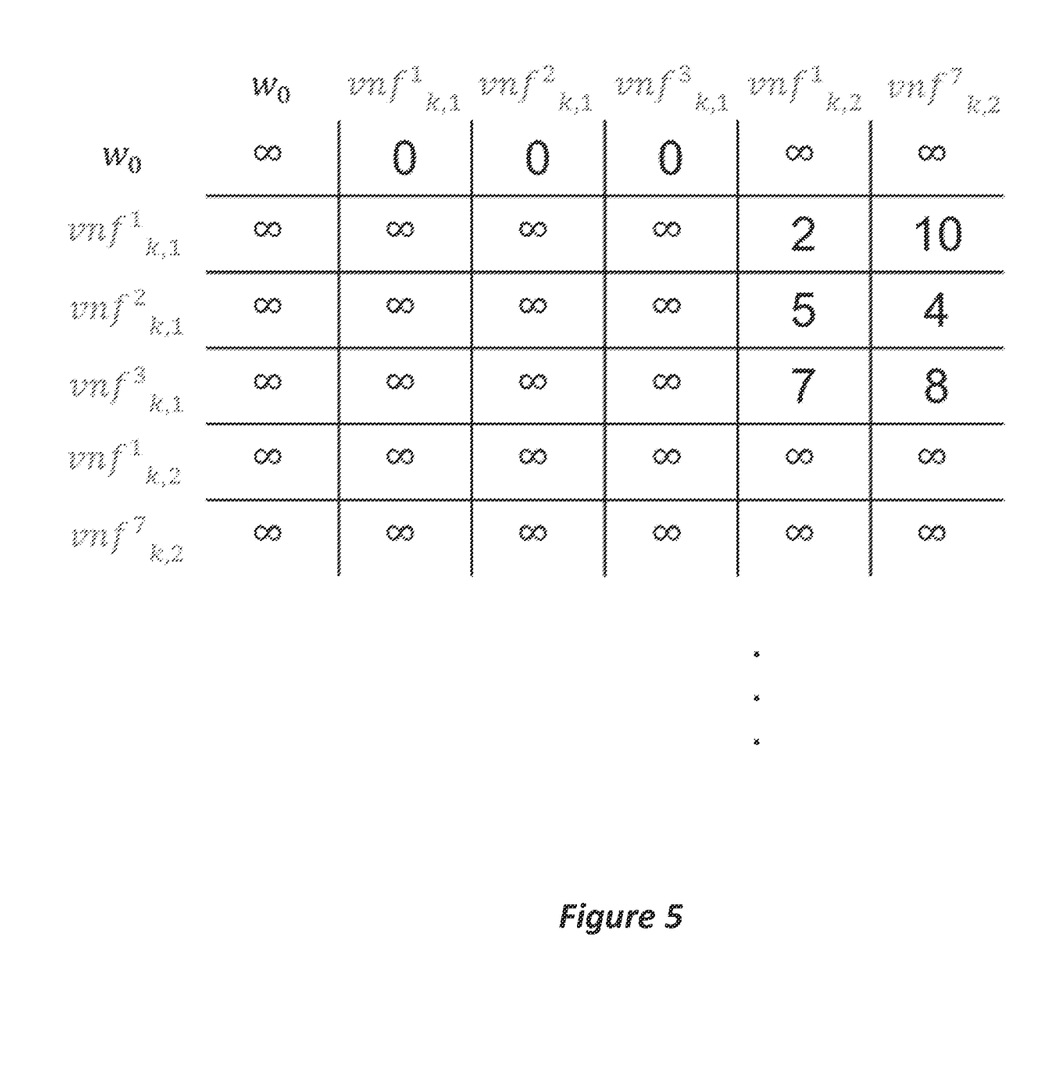
FIG. 5 illustrates an example mapping matrix.

Graph 400 illustrates each VNF. Notice in graph 400, the first node $w_0$ is the source of the $SFC_k$, and $w_3$ is the destination of an SFC, which has three VNFs. The weights on the nodes represent the cost of the InP to perform the VNF. With all neighboring sets, the embodiments can build an adjacency matrix, as illustrated by matrix 500 of FIG. 5.

It is beneficial to highlight two characteristics that might appear on the graph construction. The first one is that it is not required to have fully connected and contiguous VNFs. In other words, it is possible that a node does not reach some of the following nodes due to networking restrictions, or policy enforcement by providers, for example.

The second characteristic is that it is possible to have multiple inputs and outputs in a provider. What that means is that a path in the graph can consider a back and forth action to the same provider if that provider can meet two or more non-sequential VNFs.

One significant contribution of the disclosed embodiments relates to a solution for SFC partitioning that addresses the challenges posed by multi-provider environments. The solution includes an innovative graph-based approach augmented with DLT that enables the segmentation of VNFs of an SFC and their distribution over different providers. In particular, the embodiments beneficially provide a graph-based SFC partitioning approach that is augmented with DLT. The embodiments are able to consider the partitioning of the SFCs. Doing so enhances the chances of meeting SFC requests that a single provider would not be able to meet because the more providers there are, the higher the likelihood of satisfying the VNFs.

The embodiments also beneficially provide an auction-based process to allocate SFC partitions. The embodiments use the characteristics of the graph to execute an auction process by finding the shortest path between the source and the destination of an SFC and by using that path to define the winner providers that will allocate and meet each SFC partition.

Another beneficial aspect that the disclosed solutions enable is a way to ensure trustfulness in the presence of autonomous providers so as they can establish trust in each other and in the process of VNF group assignment. This way, providers have the chance to deliver their services and increase their revenue. The disclosed SFC partitioning solution follows a graph-based approach focusing on finding the VNF group configuration that best meets the SLA requirements of the requested SFC while providing a cost-effective placement plan over all involved providers. Such solution enables providers to deliver their services in a manner that guarantees a return while benefiting users to pay for cheaper services.

Considering the competitive environment of edge computing with autonomous InPs, the embodiments are able to provide an auction-based approach that can enhance the process of choosing which InPs will take part in meeting each SFC partition. The embodiments consider a reverse Vickrey's auction approach that chooses the second-lowest bid as the winner of the auction. This auction strategy is meant to seek the true price of the auctioned item and tries to make the auction fairer by rewarding the winner of the auction that submitted the bid value nearest to the asking value (e.g., settled price). The advantage of the second-best bid auction is that, in theory, there is one dominant strategy for winning it and that is to bid on the true value of the item that is bid on. Following this strategy ensures that a bidder will get the best possible result regardless of what the other bidders do.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
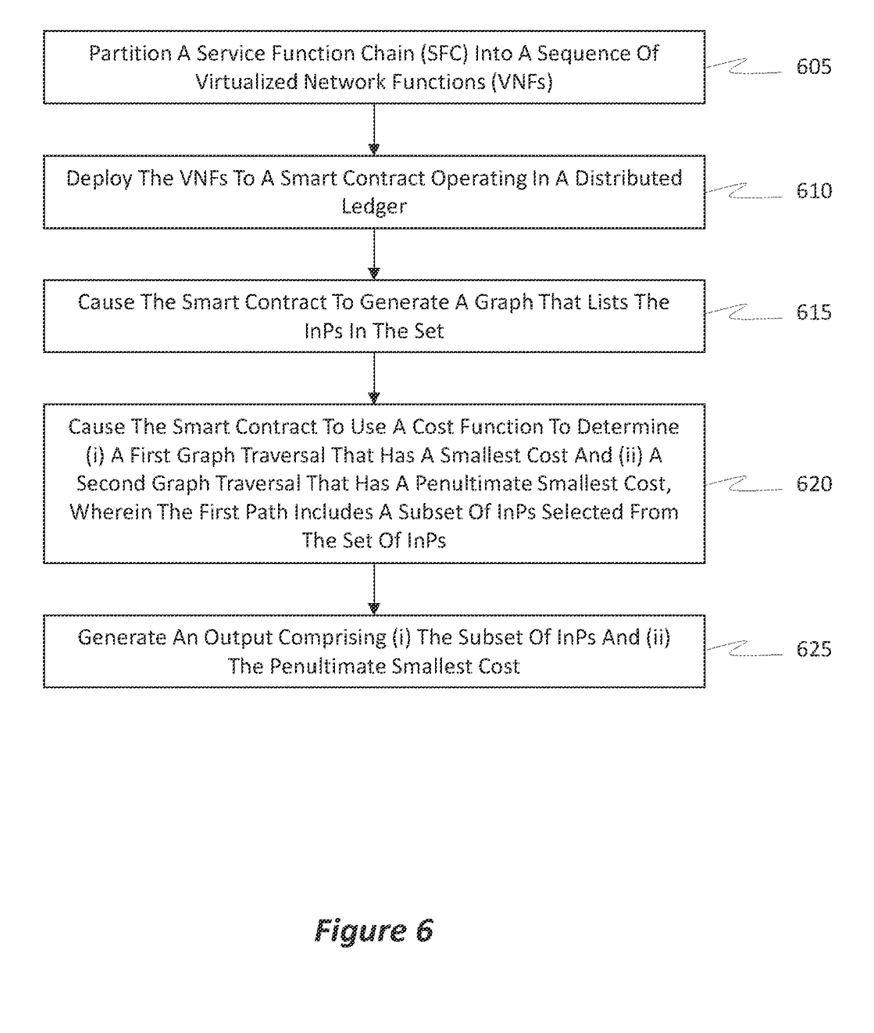
FIG. 6 illustrates a flowchart of an example method for partitioning a workload and for allocating those partitions to service providers.

Attention will now be directed to FIG. 6, which illustrates a flowchart of an example method 600 for intelligently partitioning an SFC into multiple VNFs and for intelligently allocating those VNFs to multiple different InPs. Method 600 can be implemented within the architecture 100 of FIG. 1. Also, method 600 can be performed by service 105, and service 105 can control a smart contract 105A.

Method 600 includes an act (act 605) of partitioning a service function chain (SFC) into a sequence of virtualized network functions (VNFs). Notably, the sequence defines an order as to how the VNFs are to be serviced.

For instance, it might be the case that the SFC is partitioned into three separate VNFs (e.g., VNF A, VNF B, and VNF C). Based on the characteristics of the SFC, the VNFs may be required to be serviced in a specific sequence or order. For instance, it might be the case the VNF A is to be serviced first. After VNF A is serviced, it might be the case that VNF B is to be serviced. After VNF C is serviced, it might be the case that VNF C is to be serviced. Thus, the defined sequence not only lists the VNFs that are created as a result of the partitioning operation, but the defined sequence also lists the order that those VNFs are required to be serviced.

Act 610 includes deploying the VNFs to a smart contract (e.g., a layer-2 smart contract) operating in a distributed ledger. The smart contract initiates a bid to service the SFC by a set of infrastructure providers (InPs). The distributed ledger lists, for each InP in the set: (i) a specific VNF that each InP is able to service and that is included in the sequence of VNFs and (ii) a corresponding cost to service that specific VNF. In some scenarios, what triggers the execution of the smart contract is not the arrival of the VNFs, but rather the arrival of the SFC (i.e. a request for a sequence of VNFs to be executed). Typically, VNFs are not submitted to the system; rather, they are code deployed on computing nodes to be executed on demand. What is submitted to the system is the SFC request, which triggers the execution of the smart contract to decide which providers will actually execute the VNFs that make up the SFC.

For instance, continuing the example from above, it might be the case that three InPs are involved (e.g., InP A, InP B, and InP C). InP A may be listed as being able to service VNF A (with a cost of "x") and VNF B (with a cost of "y"). InP B may be listed as being able to service VNF B (with a cost of "y-1") and VNF C (with a cost of "z"). InP C may be listed as being able to service only VNF C (with a cost of "z-2").

Thus, in one example, the set of InPs may include a first InP and a second InP. The sequence of VNFs includes a first VNF and a second VNF. In this example, the first InP is able to service the first VNF but not the second VNF, and the second InP is able to service the second VNF but not the first VNF. Accordingly, the distributed ledger can list which VNFs each InP is able to service and can also list the costs associated with those InPs.

In some cases, the distributed ledger further lists a capacity for each of the InPs in the set. For instance, the capacity can refer to the amount of resources the InPs are able to commit to servicing the VNFs. This capacity can further indicate the amount of time that will be required to service the VNFs.

Act 615 includes causing the smart contract to generate a graph (e.g., a distributed ledger graph aka a DLT graph). This graph lists the InPs in the set. Also, the graph lists the InPs in the set in a manner to reflect the defined order.

The graph also lists corresponding InP costs for the VNFs in the set. For instance, graph 400 of FIG. 4 shows five columns of circles. The leftmost column is a source marked as $w_0$. The second column from the left includes three circles, all corresponding to the same VNF but serviced by three different InPs. The middle column includes four circles corresponding to the same VNF. These VNFs are serviced by four different InPs. The fourth column includes two circles corresponding to the same VNF. These VNFs are serviced by two different InPs.

Graph 400 orders its nodes in a manner to correspond with the required order or sequence of VNF executions. For instance, the VNF in the second column is required to be serviced first (by whichever InP is selected), followed by the VNF in the middle column (by whichever InP is selected), followed by the VNF in the fourth column (by whichever InP is selected). The values inside each circular node in graph 400 correspond to the costs mentioned earlier.

Notably, at least one combination of InPs in the set is able to service the entire sequence of VNFs. For instance, graph 400 of FIG. 4 shows that at least one combination of the InPs can service the entire sequence of VNFs.

Act 620 includes causing the smart contract to use a cost function to determine (i) a first graph traversal that has a smallest cost and (ii) a second graph traversal that has a penultimate smallest cost. The first graph traversal includes a subset of InPs selected from the set of InPs. Using FIG. 4 as an example, the cheapest path (i.e. the "first graph traversal") appears to be the path comprising the following nodes/circles: $w_0$ (cost 0); $VNF^3_{k,1}$ (cost 5); $VNF^{10}_{k,2}$ (cost 9); $VNF^6_{k,3}$ (cost 1); and $w_3$ (cost 2), resulting in a total cost of 0+5+9+1+2=17. The penultimate cheapest path (i.e. the "second graph traversal") appears to be the path comprising the following nodes: $w_0$ (cost 0); $VNF^3_{k,1}$ (cost 5); $VNF^8_{k,2}$ (cost 10); $VNF^6_{k,3}$ (cost 1); and $w_3$ (cost 2), resulting in a total cost of 0+5+10+1+2=18.

Typically, the first graph traversal, which is the cheapest path, defines a shortest path between a source and a destination in the graph. With reference to FIG. 4, the source is node $w_0$, and the destination is node $w_3$.

Act 625 includes generating an output comprising (i) the subset of InPs and (ii) the penultimate smallest cost. Using the above example, the subset of InPs include those from the cheapest path (e.g., $w_0$ (cost 0); $VNF^3_{k,1}$ (cost 5); $VNF^{10}_{k,2}$ (cost 9); $VNF^6_{k,3}$ (cost 1); and $w_3$ (cost 2)). The cost that is included in the output, however, includes the cost from the penultimate cheapest path (e.g., the cost of 18).

Optionally, the output may then be written to the distributed ledger. Thus, the output can be recorded for other entities to view. Also, the output is duplicable based on the data stored in the distributed ledger. In some cases, method 600 further includes an act of determining that no single one of the InPs in the set is able to service the entire defined sequence of VNFs. It might not always be the case that there is no single InP capable of executing all of the SFC's VNFs (i.e. a single InP might be able to execute all of the VNFs), but rather, that the execution by a single InP may not have the lowest "cost" compared to a "pool" of InPs. That is, execution by several InPs might actually have a lower cost (as compared to the single InP), and that is why the solution involving several providers is selected as the shortest path (i.e. graph traversal).

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
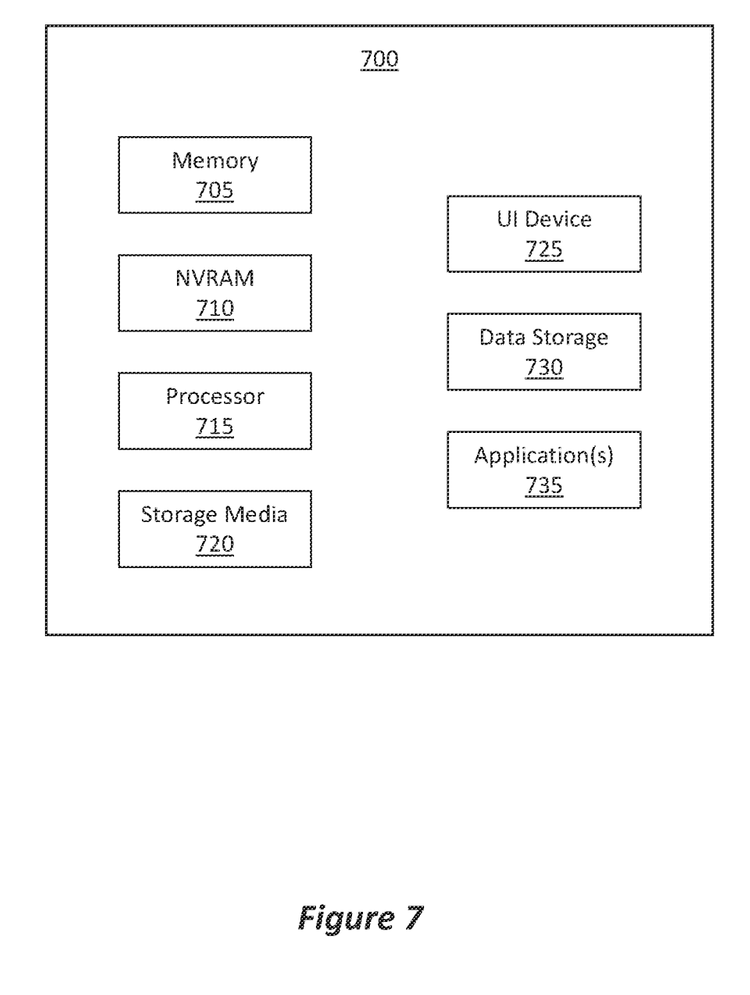
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7. Device 700 can implement the architecture 100 of FIG. 1.

In the example of FIG. 7, the physical computing device 700 includes a memory 705 which may include one, some, or all, of random access memory (RAM), non-volatile memory (NVM) 710 such as NVRAM for example, read-only memory (ROM), and persistent memory, one or more hardware processors 715, non-transitory storage media 720, UI device 725, and data storage 730. One or more of the memory 705 of the physical computing device 700 may take the form of solid-state device (SSD) storage. Also, one or more applications 735 may be provided that comprise instructions executable by one or more hardware processors 715 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein. The physical device 700 may also be representative of an edge system, a cloud-based system, a datacenter or portion thereof, or other system or entity.

The disclosed embodiments can be implemented in numerous different ways, as described in the various different clauses recited below.

Clause 1. A method comprising: partitioning a service function chain (SFC) into a sequence of virtualized network functions (VNFs), wherein the sequence defines an order as to how the VNFs are to be serviced; deploying the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF; causing the smart contract to generate a graph that lists the InPs in the set, wherein the graph lists the InPs in the set in a manner to reflect the defined order, and wherein the graph lists corresponding InP costs for the VNFs in the set; causing the smart contract to use a cost function to determine (i) a first graph traversal that has a smallest cost and (ii) a second graph traversal that has a penultimate smallest cost, wherein the first graph traversal includes a subset of InPs selected from the set of InPs; and generating an output comprising (i) the subset of InPs and (ii) the penultimate smallest cost.

Clause 2. The method of clause 1, wherein the output is written to the distributed ledger.

Clause 3. The method of clause 1, wherein the method includes determining that no single one of the InPs in the set is able to service the entire defined sequence of VNFs.

Clause 4. The method of clause 1, wherein the distributed ledger further lists a capacity for each of the InPs in the set.

Clause 5. The method of clause 1, wherein at least one combination of InPs in the set is able to service the entire sequence of VNFs.

Clause 6. The method of clause 1, wherein the smart contract is a layer-2 smart contract.

Clause 7. The method of clause 1, wherein the first graph traversal defines a shortest path between a source and a destination in the graph.

Clause 8. The method of clause 1, wherein the set of InPs includes a first InP and a second InP, wherein the sequence of VNFs includes a first VNF and a second VNF, wherein the first InP is able to service the first VNF but not the second VNF, and wherein the second InP is able to service the second VNF but not the first VNF.

Clause 9. A computer system comprising: one or more processors; and one or more hardware storage devices that store instructions that are executable by the one or more processors to cause the computer system to; partition a service function chain (SFC) into a sequence of virtualized network functions (VNFs), wherein the sequence defines an order as to how the VNFs are to be serviced; deploy the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF; cause the smart contract to generate a graph that lists the InPs in the set, wherein the graph lists the InPs in the set in a manner to reflect the defined order, and wherein the graph lists corresponding InP costs for the VNFs in the set; cause the smart contract to use a cost function to determine (i) a first graph traversal that has a smallest cost and (ii) a second graph traversal that has a penultimate smallest cost, wherein the first graph traversal includes a subset of InPs selected from the set of InPs; and generate an output comprising (i) the subset of InPs and (ii) the penultimate smallest cost.

Clause 10. The computer system of clause 9, wherein the output is written to the distributed ledger.

Clause 11. The computer system of clause 9, wherein the instructions are further executable to cause the computer system to determine that no single one of the InPs in the set is able to service the entire defined sequence of VNFs.

Clause 12. The computer system of clause 9, wherein the distributed ledger further lists a capacity for each of the InPs in the set.

Clause 13. The computer system of clause 9, wherein at least one combination of InPs in the set is able to service the entire sequence of VNFs.

Clause 14. The computer system of clause 9, wherein the smart contract is a layer-2 smart contract.

Clause 15. The computer system of clause 9, wherein the first graph traversal defines a shortest path between a source and a destination in the graph.

Clause 16. The computer system of clause 9, wherein the set of InPs includes a list of InPs, wherein the sequence of VNFs includes a first VNF and a second VNF, wherein a first InP is able to service the first VNF but not the second VNF, and wherein a second InP is able to service the second VNF but not the first VNF.

Clause 17. One or more hardware storage devices that store instructions that are executable by one or more processors to cause the one or more processors to; partition a service function chain (SFC) into a sequence of virtualized network functions (VNFs), wherein the sequence defines an order as to how the VNFs are to be serviced; deploy the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF; cause the smart contract to generate a graph that lists the InPs in the set, wherein the graph lists the InPs in the set in a manner to reflect the defined order, and wherein the graph lists corresponding InP costs for the VNFs in the set; cause the smart contract to use a cost function to determine (i) a first graph traversal that has a smallest cost and (ii) a second graph traversal that has a penultimate smallest cost, wherein the first graph traversal includes a subset of InPs selected from the set of InPs; and generate an output comprising (i) the subset of InPs and (ii) the penultimate smallest cost.

Clause 18. The one or more hardware storage devices of clause 17, wherein the output is written to the distributed ledger.

Clause 19. The one or more hardware storage devices of clause 17, wherein the instructions are further executable to cause the one or more processors to determine that no single one of the InPs in the set is able to service the entire defined sequence of VNFs.

Clause 20. The one or more hardware storage devices of clause 17, wherein the distributed ledger further lists a capacity for each of the InPs in the set.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   partitioning a service function chain (SFC) into a sequence of virtualized network functions (VNFs), wherein the sequence defines an order as to how the VNFs are to be serviced;
   deploying the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF;
   causing the smart contract to generate a graph that lists the InPs in the set, wherein the graph lists the InPs in the set in a manner to reflect the defined order, and wherein the graph lists corresponding InP costs for the VNFs in the set;
   causing the smart contract to use a cost function to determine (i) a first graph traversal that has a smallest cost and (ii) a second graph traversal that has a penultimate smallest cost, wherein the first graph traversal includes a subset of InPs selected from the set of InPs; and
   generating an output comprising (i) the subset of InPs and (ii) the penultimate smallest cost.

2. The method of claim 1, wherein the output is written to the distributed ledger.

3. The method of claim 1, wherein the method includes determining that no single one of the InPs in the set is able to service the entire defined sequence of VNFs.

4. The method of claim 1, wherein the distributed ledger further lists a capacity for each of the InPs in the set.

5. The method of claim 1, wherein at least one combination of InPs in the set is able to service the entire sequence of VNFs.

6. The method of claim 1, wherein the smart contract is a layer-2 smart contract.

7. The method of claim 1, wherein the first graph traversal defines a shortest path between a source and a destination in the graph.

8. The method of claim 1, wherein the set of InPs includes a first InP and a second InP, wherein the sequence of VNFs includes a first VNF and a second VNF, wherein the first InP is able to service the first VNF but not the second VNF, and wherein the second InP is able to service the second VNF but not the first VNF.

9. A computer system comprising:
   one or more processors; and
   one or more hardware storage devices that store instructions that are executable by the one or more processors to cause the computer system to;
   partition a service function chain (SFC) into a sequence of virtualized network functions (VNFs), wherein the sequence defines an order as to how the VNFs are to be serviced;
   deploy the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF;
   cause the smart contract to generate a graph that lists the InPs in the set, wherein the graph lists the InPs in the set in a manner to reflect the defined order, and wherein the graph lists corresponding InP costs for the VNFs in the set;
   cause the smart contract to use a cost function to determine (i) a first graph traversal that has a smallest cost and (ii) a second graph traversal that has a penultimate smallest cost, wherein the first graph traversal includes a subset of InPs selected from the set of InPs; and
   generate an output comprising (i) the subset of InPs and (ii) the penultimate smallest cost.

10. The computer system of claim 9, wherein the output is written to the distributed ledger.

11. The computer system of claim 9, wherein the instructions are further executable to cause the computer system to determine that no single one of the InPs in the set is able to service the entire defined sequence of VNFs.

12. The computer system of claim 9, wherein the distributed ledger further lists a capacity for each of the InPs in the set.

13. The computer system of claim 9, wherein at least one combination of InPs in the set is able to service the entire sequence of VNFs.

14. The computer system of claim 9, wherein the smart contract is a layer-2 smart contract.

15. The computer system of claim 9, wherein the first graph traversal defines a shortest path between a source and a destination in the graph.

16. The computer system of claim 9, wherein the set of InPs includes a list of InPs, wherein the sequence of VNFs includes a first VNF and a second VNF, wherein a first InP is able to service the first VNF but not the second VNF, and wherein a second InP is able to service the second VNF but not the first VNF.

17. One or more hardware storage devices that store instructions that are executable by one or more processors to cause the one or more processors to;
  partition a service function chain (SFC) into a sequence of virtualized network functions (VNFs), wherein the sequence defines an order as to how the VNFs are to be serviced;
  deploy the VNFs to a smart contract operating in a distributed ledger, wherein the smart contract initiates a bid to service the SFC by a set of infrastructure providers (InPs), wherein the distributed ledger lists, for each InP in the set: (i) a specific VNF that said each InP is able to service and that is included in the sequence of VNFs and (ii) a corresponding cost to service that specific VNF;
  cause the smart contract to generate a graph that lists the InPs in the set, wherein the graph lists the InPs in the set in a manner to reflect the defined order, and wherein the graph lists corresponding InP costs for the VNFs in the set;
  cause the smart contract to use a cost function to determine (i) a first graph traversal that has a smallest cost and (ii) a second graph traversal that has a penultimate smallest cost, wherein the first graph traversal includes a subset of InPs selected from the set of InPs; and
  generate an output comprising (i) the subset of InPs and (ii) the penultimate smallest cost.

18. The one or more hardware storage devices of claim 17, wherein the output is written to the distributed ledger.

19. The one or more hardware storage devices of claim 17, wherein the instructions are further executable to cause the one or more processors to determine that no single one of the InPs in the set is able to service the entire defined sequence of VNFs.

20. The one or more hardware storage devices of claim 17, wherein the distributed ledger further lists a capacity for each of the InPs in the set.

* * * * *